United States Patent [19]
Hicks

[11] Patent Number: 5,343,272
[45] Date of Patent: Aug. 30, 1994

[54] FILM DRIVE ASSEMBLY

[76] Inventor: Ray Hicks, 2605 Corunna Rd., Flint, Mich. 48503

[21] Appl. No.: 63,651

[22] Filed: May 20, 1993

Related U.S. Application Data

[63] Continuation-in-part of Ser. No. 919,914, Jul. 27, 1992, Pat. No. 5,257,066.

[51] Int. Cl.$^5$ .............................................. G03B 27/62
[52] U.S. Cl. ......................................... 355/75; 352/80; 355/54
[58] Field of Search ...................... 355/72, 75, 126, 54; 352/80

[56] References Cited

U.S. PATENT DOCUMENTS

| Re. 28,046 | 6/1974 | Renold | 355/54 |
|---|---|---|---|
| 3,910,698 | 10/1975 | Sone et al. | 355/54 X |
| 4,501,489 | 2/1985 | Goulard et al. | 355/54 |
| 4,652,117 | 3/1987 | Kogane et al. | 355/72 |
| 4,908,657 | 3/1990 | Kogane | 355/75 |
| 5,097,292 | 3/1992 | Hicks | 355/75 |
| 5,146,266 | 9/1992 | Hicks | 355/50 |
| 5,257,066 | 10/1993 | Hicks | 355/75 |

Primary Examiner—Richard A. Wintercorn
Attorney, Agent, or Firm—Krass & Young

[57] ABSTRACT

A film drive mechanism for positioning film relative to the optical stage of a commercial printer. The mechanism includes a film drive assembly and a mount base assembly. The film drive assembly includes an elongated frame member, a feed spool mounted on one end of the frame member, a takeup spool mounted on the other end of the frame member, and guide means for moving the film between the spools along a longitudinal feed path. The film drive assembly is mounted for lateral movement on the mount base assembly. The film drive assembly is adjusted on the mount base assembly for a particular width of film by a selector knob positioned on a selector shaft carried by the film drive unit and including a plurality of tabs selectively coacting with a detent in a guide shaft carried by the mount base. Fine adjustment of the film drive assembly relative to the mount base assembly to accommodate the cropping requirements of each frame of the film is accomplished by a driven pulley carried by the film drive assembly and threadably engaging the selector shaft with the selector shaft restrained against rotation so that rotation of the pulley moves the film drive assembly along the axis of the selector shaft.

12 Claims, 4 Drawing Sheets

FILM DRIVE ASSEMBLY

RELATED APPLICATION

This application is a continuation-in-part of U.S. patent application Ser. No. 919,914, filed on Jul. 27, 1992, now U.S. Pat. No. 5,257,066, issued Oct. 26, 1993.

BACKGROUND OF THE INVENTION

This invention relates to film drive assemblies for photographic printers and, more particularly, to methods for attachment of film drive assemblies to photographic printers.

Commercial photographic processing laboratory require the capability of making vast numbers of photographic prints from equally large numbers of photographic negatives. The photographic negatives are typically handled in long roll form, and are processed in photographic printers by mounting the long roll of negative film on mechanized film drives. The photographic printers may operate in both automated and semi-automated environments.

Most film drives for use with these photographic printers are either electrically or pneumatically powered. A continuous roll of exposed and developed photographic film is mounted on the feed spool of the film drive and routed across the optical stage of the photographic printer. Individual negative frames are sequentially positioned at the optical stage of the photographic printer by operation of the drive components of the film drive so that one or more photographic prints can be made from each frame, under either operator or machine control. Finally, the film is collected on a film takeup spool of the film drive.

Because photographic film is manufactured in a variety of different widths, a film drive needs to be capable of variably positioning the film in relation to the photographic printer so that the longitudinal center line of the various widths of photographic film can be positioned to correspond with the optical center of the photographic printer. And because each frame of a roll of photographic film requires individual cropping, a film drive further must be capable of variably positioning each frame of a roll of film of a given width.

A number of devices have been developed and utilized, with limited success, to provide the capacity for variably positioning the film in relation to the printer. In U.S. patent application Ser No. 359,852, filed May 31, 1989, now U.S. Pat. No. 5,097,292 issued Mar. 17, 1992 an apparatus is disclosed consisting essentially of two nested brackets, one affixed to the printer work surface and the second slidably affixed to the first. An alternative type currently used in printers manufactured by Lucht Engineering of Minneapolis, Minn., permits the entire drive assembly to slide longitudinally across a limited portion of the printer work station top surface. Both of these devices utilize electronic position sensing switches to relocate the film center line. This arrangement has not been entirely satisfactory since it requires sophisticated Hall effect magnetic sensor technology to function with a degree of reliability necessary in a commercial setting. Additionally, removal of the drive mechanism is frequently time consuming and labor intensive. The present invention addresses these problems.

SUMMARY OF THE INVENTION

The present invention provides a film drive assembly for use with photographic equipment of the type including an optical stage defining an optical center line. The assembly includes a film drive unit including an elongated frame member, a feed spool mounted on one end of the frame member, a takeup spool mounted on the other end of the frame member, and guide means for moving the film between the spools along a longitudinal feedpath; a mount base having a central aperture adapted to be positioned proximate the optical stage of the photographic equipment; and mounting means including means mounting the film drive unit on the mount base with the longitudinal path of the film passing over the mount base aperture and means mounting the film drive unit for lateral movement on the mount base to move the longitudinal center line of the film path relative to the optical center line of the photographic equipment.

According to an important feature of the invention, coacting interengaging means are provided on the film drive unit and the mount base; the film drive unit is grossly laterally adjusted relative to the mount base to accommodate a particular width of film by interengaging the coacting means on the film drive unit and the mount base in a selected position corresponding to the particular film width; and the film drive unit is thereafter finely laterally adjusted for each frame of the film by adjusting the lateral position of the film drive unit relative to the interengaged coacting means. This arrangement provides a simple and effective means of grossly adjusting the film drive unit to accommodate a particular width of film and to thereafter finely adjust the film drive unit for each frame of film so as to facilitate cropping of each frame.

According to a further feature of the invention, the coacting interengaging means on the film drive unit and the mount base includes a selector mechanism including a shaft extending laterally of the film drive unit, and the fine adjustment means is operative to move the film drive unit relative to the shaft. This arrangement provides a simple and effective means of providing both the gross and fine adjustment of the film drive unit to respectively accommodate varying film width and varying cropping requirements for each frame.

According to a further feature of the invention, the shaft is carried by the film drive unit. This specific arrangement further simplifies the overall construction and operation of the assembly.

According to a further feature of the invention, the shaft includes a portion extending in cantilever fashion from the film drive unit and the selector mechanism further includes a selector member mounted on the free end of the shaft portion and rotatable about the axis of the shaft portion to selectively provide the plurality of interengaged positions corresponding to each width of film.

According to a further feature of the invention, the means mounting the film drive unit for lateral movement on the mounting base includes at least one laterally extending guide rail on the mounting base and the selector mechanism further includes a keeper structure on the guide rail for coaction with the selector member in any selectably rotated position of the selector member.

According to a further feature of the invention, the film drive unit includes a nut member threadably engaging the shaft, and the fine adjustment means includes drive means operative to generate relative rotation between the shaft and the nut member so as to move the film drive unit relative to the shaft. In the disclosed embodiment of the invention, the shaft is held against rotation, the drive means is operative to rotate the nut member, the drive means includes an electric motor mounted on the film drive unit, and the nut means comprises a pulley driven by the motor and having an internal thread engaging threads on the shaft.

DETAILED DESCRIPTION OF THE PREFERRED EMBODIMENT

Figure 1:
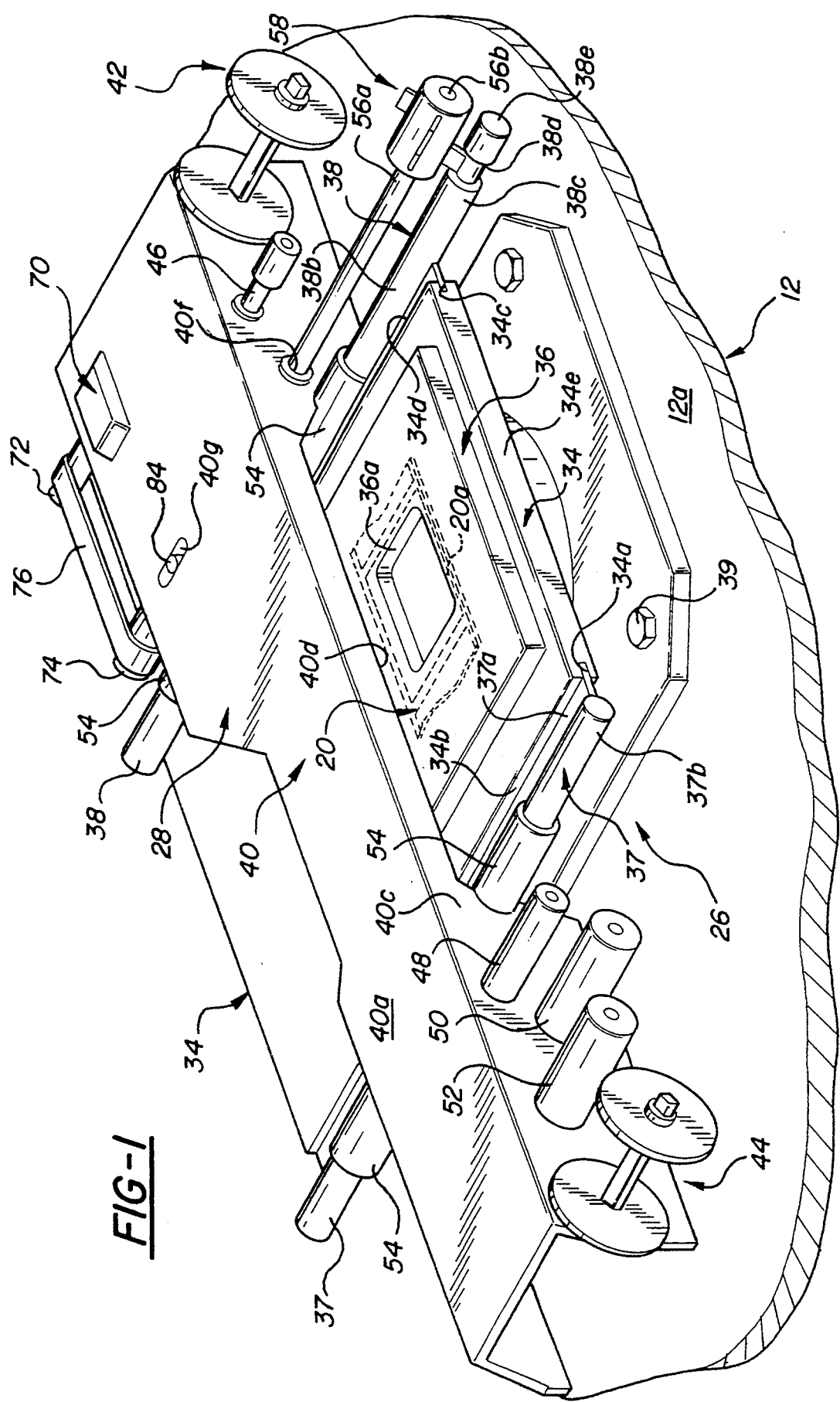
FIG. 1 is a perspective view of the invention film drive assembly.
Figure 2:
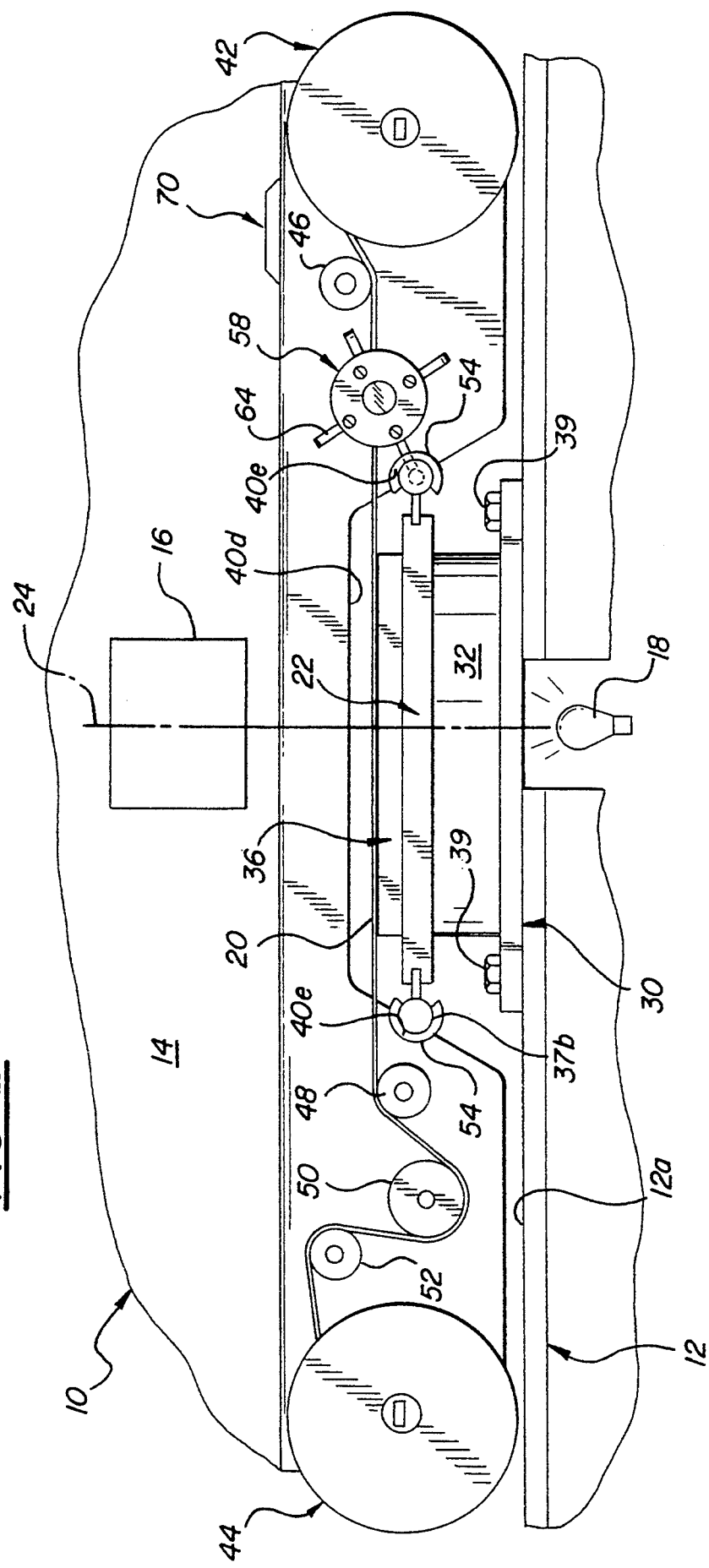
FIG. 2 is a front elevational view of the invention film drive assembly shown in association with a photographic printer.
Figure 3:
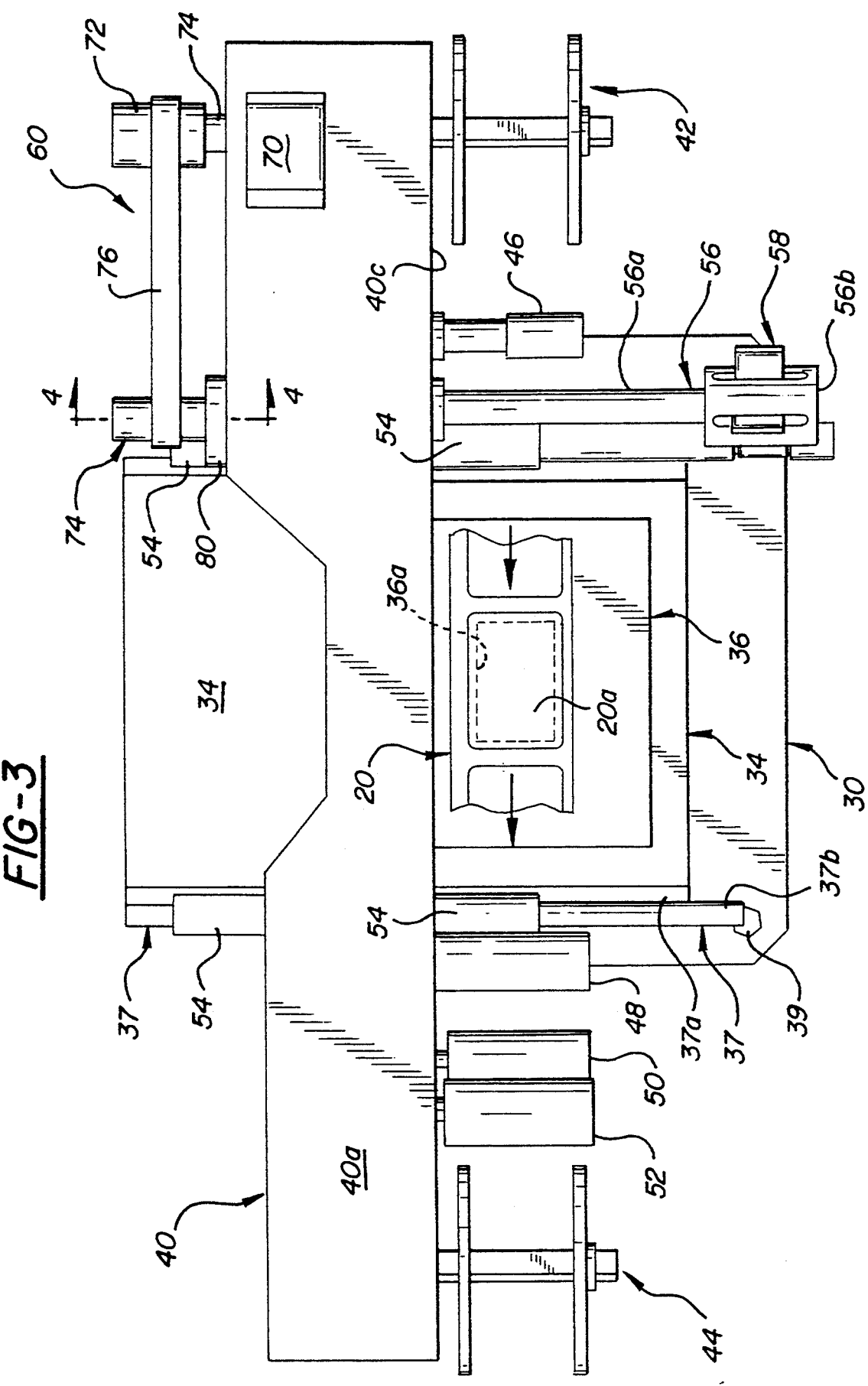
FIG. 3 is a plan view of the invention film drive assembly.
Figure 5:
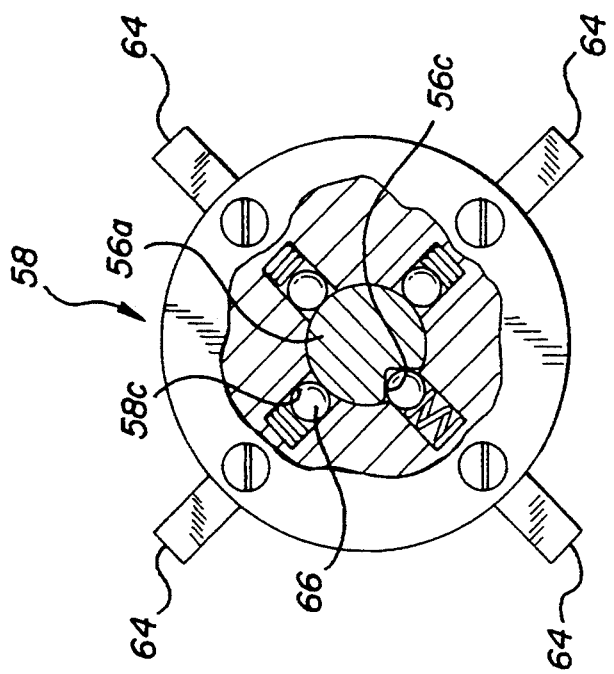
FIGS. 5 and 6 are detail views of a selector mechanism utilized in the invention film drive assembly.
Figure 4:
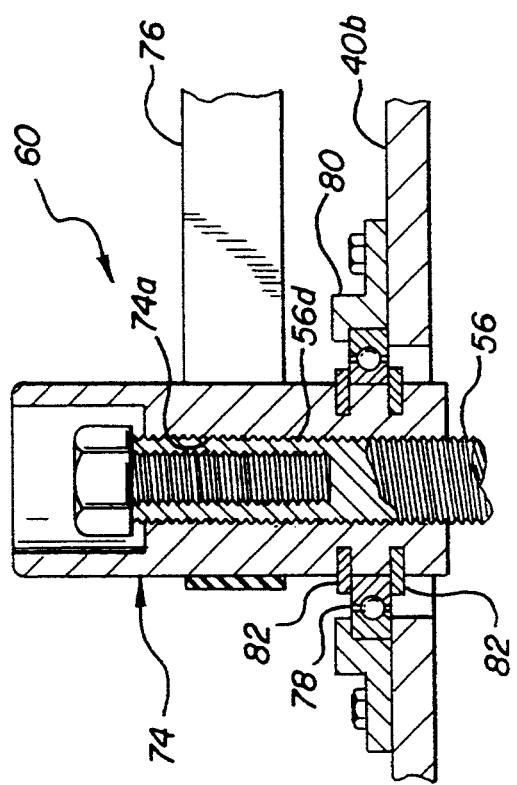
FIG. 4 is a detail view taken within the circle of FIG. 3.
Figure 6:
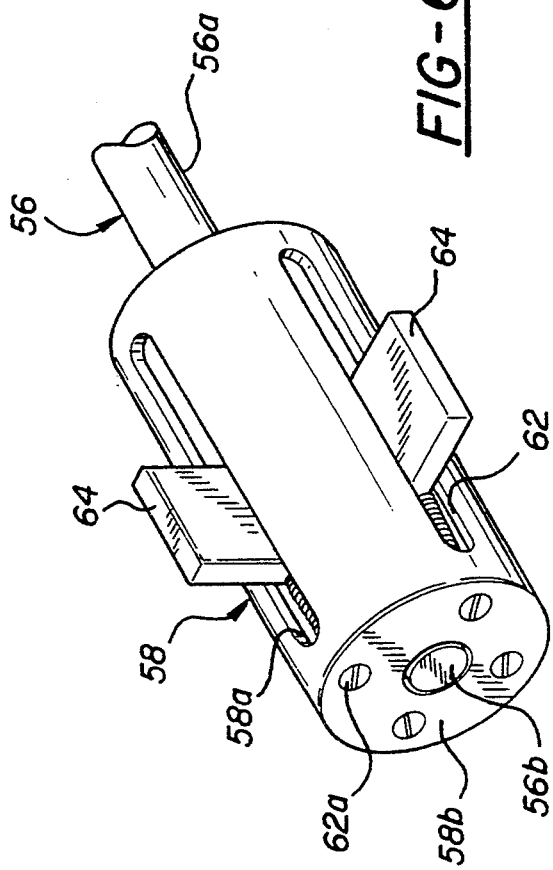

The present invention is intended for use with a commercial photographic printer 10 seen fragmentarily in FIG. 2 and including a work table 12 defining a table surface 12a; a light proof photographic paper drive cabinet 14 positioned above surface 12a; a lens deck 16 containing a plurality of lenses positioned above top surface 12 and operative to project the photographic image of a frame or film onto the photographic paper contained within cabinet 14; and an illumination source 18 positioned below surface 12a and operative to project light upwardly through film 20 positioned at an optical stage 22 of the printer. Source 18 and lens 16 are aligned on the optical center line 24 of the printer.

The invention film drive, broadly considered, includes a mount base assembly 26 and a film drive assembly 28.

Mount base assembly 26 includes a base 30, a pedestal 32, a rotary table 34, a riser block 36, and guide rails 38.

Base 30 has a generally rectangle configuration and is fixedly secured to the upper face 12a of printer table 12 as by bolts 39.

Pedestal 32 is secured to and upstands centrally from base 26 and has a generally circular configuration.

Rotary table 34 has a generally rectangular configuration and is mounted by pedestal 32 for rotational movement about a central vertical axis that is aligned with optical center line 24.

Riser block 36 is removably positioned on top of rotary table 34 and includes a central aperture 36a which is adapted to be positioned centrally relative to the optical center line 24 of the printer. It will be understood that the rotary mounting of rotary table 34 on pedestal 32 allows the rotary table to pivot 90° to allow frames of film positioned over the aperture 36a to be exposed in either a landscape or portrait format. A glass or plastic lens (not shown) may be disposed in central aperture 36a. The lens may be either transparent or translucent and provides an even diffusion of illumination across the dimensions of the film frame to ensure a reliable and even exposure.

Guide rail 37 includes a bar portion 37a fixedly received in a groove 34a provided along one side edge 34b of the rotary table and a rail portion 37b of circular cross section positioned in laterally spaced relation to the side edge 34b of the rotary table.

Guide rail 38 includes a bar portion 38a received in a groove 34c provided along side edge 34d of the rotary table and a rail portion 38d of circular cross section laterally spaced from the table edge 34d. Guide rail further includes a portion 38c extending in cantilever fashion from the longitudinal edge 34e of the rotary table and including a reduced diameter shaft portion 36d proximate the free end 38e of the shaft defining a detent or keeper structure.

Film drive assembly 28 includes a frame 40, a feed spool 42, a takeup spool 44, guide spools 46, 48, 50, and 52, C tubes 54, a selector shaft 56, a selector or index knob 58, and a vernier adjustment assembly 60.

Frame 40 is formed from a single piece of sheet aluminum and has a generally inverted U configuration including a top wall 40a, a rear wall 40b, and a front wall 40c. Front wall 40c includes a cutout 40d to accommodate the mount base assembly 26, and a similar cutout is provided in the rear wall 40b.

Feed spool 42 is mounted on the front face 40c of the frame proximate one end of the frame, takeup spool 44 is mounted on the front face 40c of the frame at the other end of the frame, and guide spools 46, 48, 50, and 52 are positioned on the front face 40c of the frame between feed spool 42 and takeup spool 44 and coact to define a longitudinal feedpath for the film 20 extending between the feed spool and the takeup spool and passing over the aperture 36a of the riser block 36.

C tubes 54 each have a C configuration in cross section and are positioned in facing relation to each other in cutouts 40e provided in the front and back walls 40b and 40c of the frame at opposite sides of the cutout 40d.

Selector shaft 56 has a circular cross section and passes slidably through a journal aperture 40f provided in the front wall 40c of the frame with a portion 56a extending in cantilever fashion from the front wall 40c and terminating in a free end 56b.

Selector or index knob 58 has a generally circular configuration and is mounted for rotation on the cantilever portion 56a of selector shaft 56 proximate the free end 56b. Selector knob 58 is provided with four slots 58a extending parallel to the axis of shaft 56 and spaced equally circumferentially about the knob. A corresponding plurality of threaded shafts 62 are positioned in the slots 58a. The threaded shafts 62 have a slotted end 62a positioned proximate the outboard face 58b of the selector knob to allow for manual rotation of the screws. Tabs 64 are threadably mounted on respective threaded shaft 62 and extend radially outwardly from the selector knob at circumferentially spaced locations about the knob. The tabs 64 are moved laterally along the central axis of selector shaft 56 by selective rotation of threaded shafts 62 utilizing the slotted ends 62a. Selector knob 58 further includes a plurality of circumferentially spaced spring biased ball plungers 66 positioned in spaced radial bores 58c in respective alignment with tabs 64. Ball plungers 66 coact with a detent 56c in shaft portion 56a to allow the knob to be selectively detentingly positioned relative to the shaft in response to manual rotation of the selector knob.

Vernier assembly 60 includes an electric stepper motor 70 mounted in the top wall 40a of the frame, a drive pulley 72 driven by stepper motor output shaft 74, a driven pulley 74, and a drive belt 76 trained around pullies 72 and 74 so that pulley 74 is rotated in response to energization of stepper motor 70.

Pulley 74 includes a threaded internal bore 74a threadably receiving the threaded end 56d of selector shaft 56. Pulley 74 is mounted for rotation relative to the frame by a ball bearing 78 which is captured by a bearing retainer 80 secured to the outboard face of frame rear wall 40b, and pulley 74 is precluded from lateral displacement relative to the frame by snap rings 82.

In the assembled relation of the mount base assembly and the film drive assembly, guide rails 37 and 38 of the mount base assembly are slidably received in respective C tubes 54 of the film drive assembly so as to mount the film drive assembly for sliding movement along the central axis of the guide rails 37 and 38 to selectively position a frame 20a of the film 20 relative to the aperture 36a of the riser block 36.

Specifically, tabs 64 of the selector knob 58 are preset by selective adjustment of the associated shafts 62 to respectively correspond to a plurality of commonly encountered film width sizes such, for example, as 35 mm, 70 mm, etc. When processing a roll of film corresponding to a given film width, the operator simply moves the film drive assembly laterally on shafts 37, 38 to a position corresponding to the particular film width being processed and then rotates the selector knob 58 to position the tab 64 corresponding to the specific film width being processed in the detent 38d of the shaft 38 to lock the film drive assembly relative to the mount base assembly. This gross adjustment of the film drive assembly relative to the mount base assembly prepares the mechanism for processing the roll of film having the width corresponding to the setting of the coacting interengaging tab 64 and detent 38d.

As each frame 20a of the film is positioned over the aperture 36a of the riser block, electric motor 70 is selectively energized to provide a fine or vernier adjustment of the film relative to the aperture 36a corresponding to the specific cropping desired for that frame. The energization of the motor 70, and thereby the fine adjustment of the lateral position of the film drive assembly for each frame, may be accomplished by a control panel under the control of the operator or may be accomplished utilizing information stored in a database for each frame and containing information with respect to the desired cropping for that particular frame.

It will be seen that the vernier or fine adjustment of the film drive assembly relative to the mount base is accomplished by rotation of the driven pulley 74 which threadably coacts with the threaded end 56d of the selector shaft 56. Selector shaft 56 includes a pin 84 rigidly upstanding from the shaft between frame front and back walls 40b and 40c and positioned in a lateral slot 40g in the top wall 40a of the frame. Since shaft 56 is thereby restrained from rotation, and since shaft 56 is also restrained from lengthwise movement by the locking interengagement of tabs 64 in detent 38d, the rotation of driven pulley 74 by belt 76 results in lateral movement of the film drive assembly 28 along the axis of guide rails 37 and 38 to move the frame 20a into a precise position relative to aperture 36a corresponding to the stored cropping database information for that frame. This fine adjustment or vernier movement of the film drive assembly will be seen to move the film drive assembly relative to the coacting interengaging tab 64 and detent 38d. As indicated previously, the rotary table may be rotated on pedestal 32 for each frame to move the frame between a portrait format and a landscape format.

The invention film drive mechanism will be seen to provide a simple and efficient means for providing a gross adjustment of the film drive assembly relative to the mount base assembly for any one of a series of film widths and to further provide a quick and precise fine or vernier adjustment of the film drive assembly relative to the mount base assembly to accommodate the specific cropping needs of each frame of the film.

Whereas a preferred embodiment of the invention has been illustrated and described in detail, it will be apparent that various changes may be made in the disclosed embodiment without departing from the scope or spirit of the invention.

I claim:

1. A film drive mechanism for use with photographic equipment of the type including an optical stage defining an optical center line, the assembly comprising:

a film drive assembly including a frame member, a feed spool mounted on the frame member, a take up spool mounted on the frame member, and guide means for moving the film between the spools along a longitudinal feed path;

a mount base assembly defining a central aperture therein adapted to be positioned proximate the optical stage of the photographic equipment;

mounting means including means mounting the film drive assembly on the mount base assembly with the longitudinal path of the film passing over the mount base assembly aperture and means mounting the film drive assembly for lateral movement on the mount base assembly to move the longitudinal center line of the film path relative to the optical center of the photographic equipment;

a selector mechanism including coacting interengaging means on the mount base assembly and on the film drive assembly having a plurality of selectable interengaged positions providing a respective plurality of gross lateral positions of the film drive assembly relative to the mount base assembly corresponding to a respective plurality of film width sizes; and vernier means operative in any interengaged position of the coacting interengaging means to move the film drive assembly relative to the coacting interengaging means to finely adjust the lateral position of the film drive assembly relative to the optical center line of the photographic equipment for each frame of the film.

2. A film drive assembly according to claim 1 wherein:

the selector mechanism includes a shaft extending laterally of the film drive assembly and the vernier means is operative to move the film drive assembly relative to the shaft.

3. A film drive assembly according to claim 2 wherein:

the shaft is carried by the film drive assembly.

4. A film drive assembly according to claim 3 wherein:

the shaft includes a portion extending in cantilever fashion from the film drive assembly; and the selector mechanism further includes a selector member mounted on the free end of the shaft portion and rotatable about the axis of the shaft portion to selectively provide the plurality of interengaged positions.

5. A film drive assembly according to claim 4 wherein:

the means mounting the film drive assembly for lateral movement on the mounting base assembly includes at least one laterally extending guide rail on the mounting base assembly; and the selector mechanism further includes a keeper structure on the guide rail for coaction with the selector member.

6. A film drive assembly according to claim 3 wherein:

the film drive assembly includes a nut member threadably engaging the shaft; and the vernier means includes drive means operative to generate relative rotation between the shaft and the nut member so as to move the film drive assembly relative to the shaft.

7. A film drive assembly according to claim 6 wherein:

the shaft is held against rotation and the drive means is operative to rotate the nut member.

8. A film drive assembly according to claim 7 wherein:

the drive means includes an electric motor mounted on the film drive unit; and the nut means comprises a pulley driven by the motor and having an internal thread engaging threads on the shaft.

9. A film drive mechanism for use with photographic equipment of the type including an optical stage defining an optical center line, the film drive mechanism including a film drive assembly including a frame, a feed spool mounted on the frame, a take up spool mounted on the frame, and guide means for moving the film between the spools along a longitudinal feed path; a mount base assembly defining a central aperture adapted to be positioned proximate the optical stage of the photographic equipment; and mounting means including means mounting the film drive assembly on the mount base assembly with the longitudinal path of the film passing over the mount base assembly aperture and means mounting the film drive assembly for lateral movement on the mount base assembly to move the longitudinal center line of the film path relative to the optical center line of the photographic equipment, characterized in that:

coacting interengaging means are provided on the film drive assembly and the mount base assembly;

the film drive assembly is grossly laterally adjusted relative to the mount base assembly to accommodate a particular width of film by interengaging the coacting means on the film drive assembly and mount base assembly in a selected position corresponding to the particular film width; and the film drive assembly is thereafter finely laterally adjusted for each frame of the film by adjusting the lateral position of the film drive assembly relative to the interengaged coacting means.

10. A film drive mechanism according to claim 9 wherein:

the coacting means on the film drive assembly and the mounting base assembly comprises a keeper structure on the mounting base assembly, a selector shaft on the film drive assembly, and a selector knob mounted for rotation on the selector shaft and including a plurality of circumferentially spaced tabs sized for interengaging coaction with the keeper structure and selectively adjustable along the axis of the shaft to provide a plurality of preset positions corresponding to the respective film widths.

11. A film drive mechanism according to claim 10 wherein:

the means mounting the film drive assembly for lateral movement on the mounting base assembly includes a guide rail carried by the mounting base assembly, slidably mounting the film drive assembly, and extending parallel to the selector shaft; and the guide rail includes a detent sized to receive the tabs of the selector knob.

12. A film drive mechanism according to claim 11 wherein:

the fine lateral adjustment of the film drive assembly is accomplished by an internally threaded pulley mounted on the film drive assembly and threadably engaging a threaded portion of the selector shaft.

* * * * *